United States Patent [19]

Cone

[11] 4,384,643
[45] May 24, 1983

[54] SCREW CONVEYOR HANGER INCLUDING DISASSEMBLY MEANS

[76] Inventor: Joseph R. Cone, 3737 Elmwood Dr. NE., Cedar Rapids, Iowa 52402

[21] Appl. No.: 270,711

[22] Filed: Jun. 5, 1981

Related U.S. Application Data

[63] Continuation of Ser. No. 105,143, Dec. 19, 1979, abandoned.

[51] Int. Cl.³ .............................................. B65G 33/32
[52] U.S. Cl. .................................... 198/672; 384/258; 384/443
[58] Field of Search ........................ 198/500, 657, 672; 308/27, 29, 30, 31, 32

[56] References Cited

U.S. PATENT DOCUMENTS 715,448  12/1902  Willson ................................. 308/27
734,902   7/1903  Levalley ............................... 308/30
3,820,860  6/1974  Stone ................................... 308/27

Primary Examiner—James G. Smith
Assistant Examiner—Douglas D. Watts
Attorney, Agent, or Firm—Allan L. Harms

[57] ABSTRACT

An improved screw conveyor hanger comprising a top frame, a pair of upper bar members fastened to said frame and fastened to each other in opposed configuration, a pair of lower bar members each fastened at one end to the upper bar members and at the other end forming by a fixed spacial relationship a bearing enclosure, a bearing of split cylindrical configuration, key means to prevent rotation of the bearing in its enclosure, optional means for introduction of a lubrication tube into said hanger allowing penetration of lubricant to the bearing inner surface, optional gusset and welding means to strengthen said hanger.

5 Claims, 5 Drawing Figures

SCREW CONVEYOR HANGER INCLUDING DISASSEMBLY MEANS

This application is a continuation of application Ser. No. 105,143, filed Dec. 19, 1979.

SUMMARY OF THE INVENTION

The present invention relates to improved hanger assemblies for screw conveyor applications.

It is common practice to hang a driven screw conveyor shaft in a trough utilizing hangers which house a split bearing of suitable material. Varieties of such hangers are available which allow for different mounting configurations, bearing lubrication, and bearing replacement. Such hangers are subject to varying levels of loading. Typically, such hangers experience stress failures at the points where bends of the metal components are most pronounced, necessitating replacement of the entire hanger assembly or of components of the assembly which are difficult to remove while the hanger remains in place. Furthermore, such hangers inevitably experience wear of the incorporated bearings requiring replacement of the bearings and often these hangers experience wear of the bearing housing as well. When bearings must be replaced, considerable disassembly is required, at times including removal of the entire hanger assembly. When the bearing within the housing has worn completely and wear of the bearing housing occurs, the entire hanger assembly must be removed for repair. Because parts of existing hangers are not commonly marketed, the entire hanger usually is replaced.

The present invention presents solutions to these problems. The novel hanger herein presented consists of a top frame, two upper bar members, each formed with a substantially perpendicular been, fastened together, and further fastened on one end to the top frame, two lower bar members formed and placed in fixed spacial relationship to form a bearing housing on one end and fastened on the other end to the upper bar members, a split cylindrical bearing contained within the bearing housing formed, key means to prevent rotation of said bearing within the enclosure, and optional means to allow lubrication of the bearing. By the use of lower bar members which can be removed separately, improved methods of replacement of bearings can be utilized. The hanger need not be removed from the trough, nor must the driven shaft be removed. The user can purchase only the replacement part for the worn part, rather than needing to replace substantially all of the hanger assembly. If wear of the bearing housing has occurred, only the lower bar members need be replaced, rather than the whole assembly. If stress causes failure at the bends in the upper bar members, these parts may be replaced separately as well. In addition, because of the novel design, the bends in the upper bar members may be strengthened with gusseting or by welding the upper bar members together, or both. This method of strengthening is not possible with known hanger assemblies because the bar members must be separable to allow replacement of the bearings. The availability of these strengthening measures will reduce stress failures at the bends.

One object of this invention is to provide a novel screw conveyor hanger which can be repaired without complete removal of the hanger assembly, thus allowing repair to be done easily and quickly.

Another aspect of the invention is to provide a novel bearing enclosure which facilitates replacement of worn bearings or damaged bearing enclosure parts.

Another object is to provide an improved screw conveyor hanger which will considerably outlast other types of hangers, resulting in savings in down time and repair costs.

These objects and advantages will be apparent in the ensuing description.

DETAILED DESCRIPTION

Figure 1:
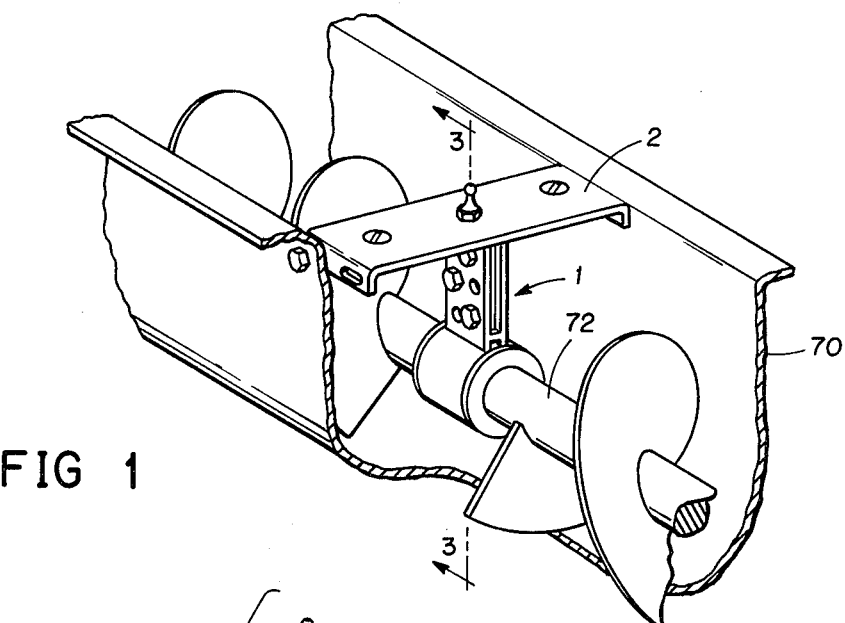
FIG. 1 is a perspective view, partially cut away, of the invention in a working application.

Referring to the drawings, FIG. 1 shows the invention 1 attached by its top frame 2 to trough 70 and supporting screw conveyor shaft 72 in a typical application of the invention.

Figure 2:
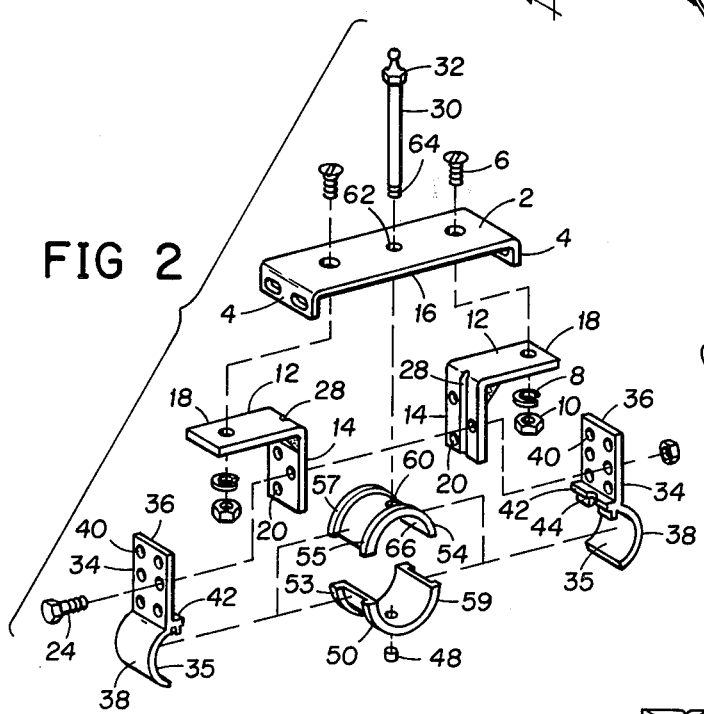
FIG. 2 is a perspective, exploded, view of an embodiment of the invention.
Figure 3:
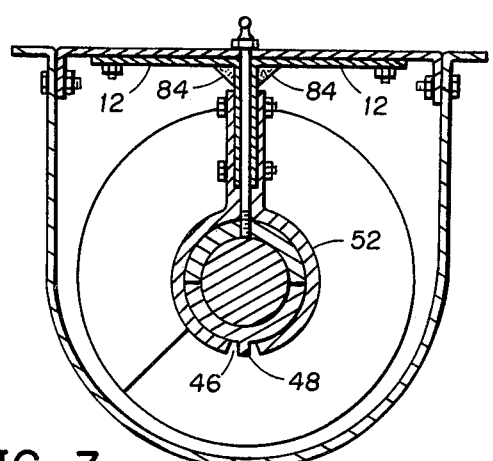
FIG. 3 is a front elevation of an embodiment of the instant invention in its working applications with one part in section.

In FIG. 2, it can be seen that one preferred embodiment of the invention contains a top frame 2, which, in this embodiment, is formed with perpendicular flanges 4 at each end thereof. Detachably fastened on ends 18 to the lower surface 16 of said top frame 2 with bolts 6, washers 8, and nuts 10, are a pair of upper bar members 12, which are each formed with a substantially perpendicular bend along their lengths to provide a perpendicular relationship between the lower ends 14 of said upper bar members 12 with respect to the lower surface 16 of top frame 2. A plurality of holes 20 are located in lower ends 14 of the upper bar members 12. Ends 14 of said upper bar members 12 are abutted, forming by way of the diametrically opposing grooves 28 an elongated cylindrical enclosure for passage of lubrication tube 30 therethrough. Lower bar members 34 having upper ends 36 and arcuate lower ends 38 contain a plurality of holes 40 in upper ends 36. Said lower bar members 34 are detachably fastened in diametrically opposing relationship to upper bar members 12 by suitable means such as by bolts 24 passing through said holes 40 in upper ends 36 and passing as well through holes 20 in lower ends 14 of the upper bar members 12. When so attached, the arcuate lower ends 38 of lower bar members 34 form a substantially cylindrical enclosure by the fixed spacial relationship between arcuate lower ends 38 thereof. Each lower bar 34 contains a shelf 42 adjacent the concave surfaces 35 of the arcuate lower ends 38 of lower bar members 34. Slot 44 appears in shelf 42. When the lower bar members 34 are mounted to upper bar members 12, shelf 42 of one lower bar member 34 abuts that of the other. Slots 44 in shelf 42 form a substantially cylindrical enclosure by the diametrically opposite spacing thereof. The enclosure formed by the spacial relationship of slots 44 exists for passage of lubrication tube 30 therethrough. The enclosure formed by the fixed spacial relationship of arcuate lower ends 38 of lower bar members 34 is incomplete, leaving slot 46, as shown in FIG. 3, in which is located key means 48. Split bearing 52, shown in FIG. 3, is comprised by upper bearing half 54 and lower bearing half 50. Upper bearing half 54 has flanges 55 and 57; lower bearing half 50 has flanges 59 and 53, said flanges comprising means to prevent axial movement of said bearing halves 54 and 50 within the enclosure formed by lower arcuate ends 38 of lower bar members 34. Key 48 is installed substantially centrally along the length of lower half bearing 50 and substantially equidistant from ends 56 of lower bearing half 50 such that key 48 will fit within slot 46 formed by the fixed spacial relationship of arcuate lower ends 38 of lower bar members 34. Upper bearing half 54 and lower bearing half 50 are placed such that the ends thereof abut and fit into the enclosure formed by the fixed spacial relationship of arcuate lower ends 38 of lower bar members 34. Lubrication tube 30 is removably positioned through opening 62 of top frame 2 and through the cylindrical enclosure formed by the fixed spacial relationship of grooves 28 and 44 of upper body bar members 12 and lower bar members 34, respectively, as well as passing through hole 60 of upper bearing half 54, such that the lower end 64 of lubrication tube 30 is substantially flush when inner surface 66 of upper bearing half 54 and top 32 of lubrication tube 30 is positioned above top frame 2.

Figure 4:
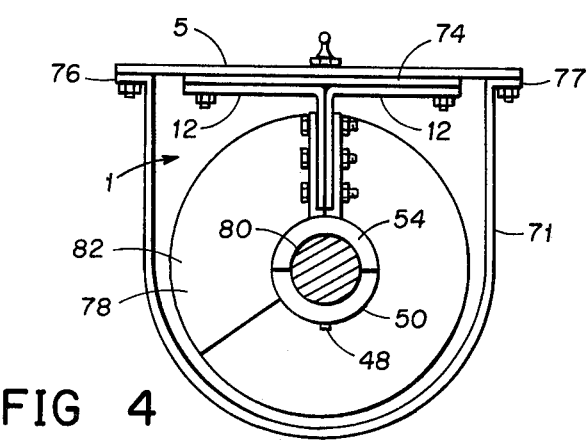
FIG. 4 is a section view of an embodiment of the invention in its working application.

FIG. 4 discloses spacer plate 74 positioned between top plate 5 and upper bar members 12. In this alternative embodiment, top plate 2 has no flanges and is mounted to flanges 76 and 77 of trough 71 on the top thereof. Screw spiral 78 is positioned within trough 71 through use of hanger 1. Shaft 80 of screw conveyor 82 is encompassed within the enclosure formed by lower bearing half 50 and upper bearing half 54. Key 48 is shown in lower bearing half 50.

FIG. 3 discloses an embodiment of the invention in section, with gussets 84 applied to the perpendicular bends of upper bar members 12.

Figure 5:
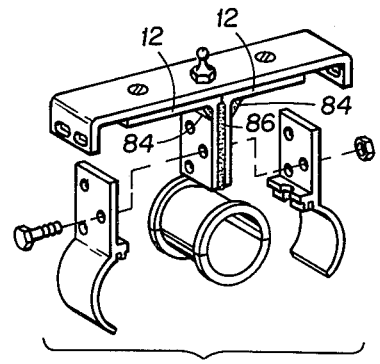
FIG. 5 is an exploded view of an alternative embodiment of the invention.

FIG. 5 discloses an embodiment wherein upper bar members 12 have been welded together along their lowr ends 14 to create a single T-shaped member 86 including gussets 84, located at the perpendicular bends of upper bar members 12.

Having described the invention, I claim

1. In a screw conveyor hanger, an improvement comprising
    a top frame,
    a pair of upper bar members formed with substantially perpendicular bends along the lengths thereof,
    the first end of each of said upper bar members detachably fastened to said top frame with the second ends of said upper bar members positioned in abutting relationship,
    a pair of lower bar members each having an upper end and a lower arcuate end, with concave surface thereon,
    the upper ends of said lower bar members detachably fastened to said second ends of said upper bar members and positioned such that said lower arcuate ends of said lower bar members form a partial enclosure.
    split bearing means inserted in said partial enclosure,
    key means to prevent rotation of said split bearing means,
    means to prevent axial movement of said split bearing means relative to said lower ends of said lower bar members,
    each lower bar member is formed with a transverse shelf located adjacent the concave surface of the lower arcuate end thereof, said shelf of one lower bar member abutting that of the other.
2. The invention of claim 1 wherein
    said upper bar members have opppositely oriented grooves in the abutting surfaces of the second ends thereof, said grooves forming a substantially vertical, cylindrical enclosure,
    said top frame containing an opening therethrough having center substantially concurrent with the axis of said vertical, cylindrical enclosure,
    said split bearing means having an opening in the upper part thereof, said opening having center substantially concurrent with the axis of said vertical, cylindrical enclsoure,
    said transverse shelf of said lower bar members having a slot therein, which when said shelves are abutted form a substantially vertical, cylindrical enclosure with axis coaxial with the axis of said enclosure formed by said grooves in said upper bar members,
    a lubrication tube inserted through said opening in said top frame, said vertical, cylindrical enclosure formed by said grooves, said substantially vertical, cylindrical enclosure formed by said slots, and said opening in said split bearing.
3. In a screw conveyor hanger, an improvement comprising
    a top frame
    a pair of upper bar members formed with substantially perpendicular bends along the length thereof.
    the first end of each of said upper bar members detachably fastened to said top frame with the second ends of said upper bar members positioned in abutting relationship,
    a pair of lower bar members each having an upper end and a lower arcuate end, with concave surface thereon,
    the upper ends of said lower bar members detachably fastened to said second ends of said upper bar members and positioned such that said lower arcuate ends of said lower bar members form a partial enclosure,
    split bearing means inserted in said partial enclosure,
    key means to prevent rotation of said split bearing means,
    means to prevent axial movement of said split bearing means relative to said lower ends of said lower bar members,
    each lower bar member is formed with a protrusion located adjacent the concave surface of the lower arcuate end thereof,
    said upper bar members having oppositely oriented grooves in the abutting surface of the second ends thereof, said grooves forming a substantially vertical, cylindrical enclosure,
    said top frame containing an opening therethrough having concurrent center with the axis of said vertical, cylindrical enclosure,
    said split bearing means having an opening in the upper part thereof said opening having concurrent center with the axis of said vertical, cylindrical enclosure,
    said protrusion of each of said lower bar members contains a slot therein,
    said protrusion of one lower bar member abutting that of the other, whereby when said protrusions are abutted, a substantially vertical, cylindrical enclosure is formed with axis coaxial with the axis of said enclosure formed by said grooves in said upper bar members, a lubrication tube inserted through said opening in said top frame, said vertical, cylindrical enclosure formed by said grooves, said vertical enclosure formed by said slots in said protrusions and said opening in said split bearing.

4. In a screw conveyor hanger, an improvement comprising a top frame, a T-shaped upper member having a first elongated end and a second end, the first elongated end of said upper member fastened to said top frame, a pair of lower bar members each having an upper end and a lower arcuate end, with concave surface thereon, the upper ends of said lower bar members detachably fastened to said second end of said upper member and positioned such that said lower arcuate ends of said lower bar members form a partial enclosure, split bearing means inserted in said partial enclosure, key means to prevent rotation of said split bearing, means to prevent axial movement of said split bearing means relative to said lower ends of said lower bar members, each lower bar member is formed with a protrusion located adjacent the concave surface of the lower arcuate end thereof, said protrusion of one lower bar member abutting that of the other, said upper T-shaped member has a substantially vertical, elongated opening therethrough, said top frame contains an opening therethrough having substantially concurrent center with the axis of said substantially vertical, elongated opening of said T-shaped member, said protrusions of said lower bar members having a slot therein which when said protrusions are abutted form a cylindrical enclosure with axis substantially coaxial with the axis of said substantially vertical, elongated opening of said T-shaped member, said split bearing means having an opening in the upper part thereof, said opening having concurrent center with the axis of said vertical, cylindrical enclosure, a lubrication tube inserted through said opening in said top frame, through said opening in said T-shaped member, through enclosure formed by said slots and through said opening in said split bearing means.

5. Apparatus to support a screw conveyor, comprising a T-shaped upper member having a first elongated end and a second end, a pair of bar members each having an upper end and a lower arcuate end, with concave surface thereon, the upper ends of said bar members detachably fastened to said second end of said T-shaped member and positioned such that said lower arcuate ends of said lower bar members form a partial enclosure, bearing means inserted in said partial enclosure, key means to prevent rotation of said bearing, means to prevent axial movement of said bearing means relative to said lower ends of said lower bar members, each bar member is formed with a protrusion located adjacent the concave surface of the lower arcuate end thereof, said protrusion of one lower bar member abutting that of the other, said upper T-shaped member has a substantially vertical, elongated opening therethrough, said protrusions of said lower bar members having a slot therein which when said protrusions are abutted form a cylindrical enclosure with axis substantially coaxial with the axis of said substantially vertical, elongated opening of said T-shaped member, said bearing means having an opening in the upper part thereof, said opening having concurrent center with the axis of said vertical, cylindrical enclosure, a lubrication tube inserted through said opening in said T-shaped member, through said enclosure formed by said slots and through said opening in said split bearing means.

* * * * *